United States Patent
Egoshi (10) Patent No.: US 12,130,081 B2
(45) Date of Patent: Oct. 29, 2024

(54) MULTISTAGE LIQUID STORAGE-TYPE CONDENSER-EVAPORATOR AND NITROGEN PRODUCTION DEVICE USING THE SAME

(71) Applicant: TAIYO NIPPON SANSO CORPORATION, Tokyo (JP)

(72) Inventor: Nobuaki Egoshi, Tokyo (JP)

(73) Assignee: TAIYO NIPPON SANSO CORPORATION, Tokyo (JP)

( * ) Notice: Subject to any disclaimer, the term of this patent is extended or adjusted under 35 U.S.C. 154(b) by 473 days.

(21) Appl. No.: 17/424,580

(22) PCT Filed: Jan. 28, 2020

(86) PCT No.: PCT/JP2020/002985
§ 371 (c)(1),
(2) Date: Jul. 21, 2021

(87) PCT Pub. No.: WO2020/158734
PCT Pub. Date: Aug. 6, 2020

(65) Prior Publication Data
US 2022/0082325 A1    Mar. 17, 2022

(30) Foreign Application Priority Data
Jan. 28, 2019   (JP) .................................. 2019-012047

(51) Int. Cl.
*F25J 3/04* (2006.01)
*C01B 21/04* (2006.01)
(Continued)

(52) U.S. Cl.
CPC ............. *F25J 3/0443* (2013.01); *C01B 21/04* (2013.01); *F25J 3/04048* (2013.01);
(Continued)

(58) Field of Classification Search
CPC ........ F25J 3/0443; F25J 3/04048; F25J 3/044; F25J 3/0429; F25J 3/04787;
(Continued)

(56) References Cited

U.S. PATENT DOCUMENTS 4,606,745 A    8/1986   Fujita
5,222,549 A    6/1993   Ishii et al.
(Continued)

FOREIGN PATENT DOCUMENTS

CN    207351252 U  *  5/2018
EP    0 866 293 A1    9/1998
(Continued)

OTHER PUBLICATIONS

International Search Report issued in PCT/JP2020/002985 dated Apr. 14, 2020 (4 pages).
(Continued)

*Primary Examiner* — Jianying C Atkisson
*Assistant Examiner* — Esmeralda Arreguin-Martinez
(74) *Attorney, Agent, or Firm* — Nixon & Vanderhye P.C.

(57) ABSTRACT

One object of the present invention is to provide a compact multistage liquid storage-type condenser-evaporator capable of producing two kinds of gases having different compositions without increasing power, and a nitrogen production device using the multistage liquid storage-type condenser-evaporator without increasing the power for producing nitrogen, and the present invention provides a multistage liquid storage-type condenser-evaporator including a bottom liquid storage section which is configured to store the liquid supplied into the bottom evaporation passage without circulating, and a fluid collection section which is configured to collect the fluid which flows out from the bottom evaporation passage and discharge to the outside without returning into the bottom liquid storage section.

9 Claims, 7 Drawing Sheets

(51) Int. Cl.
*F25J 5/00* (2006.01)
*F28D 9/00* (2006.01)
*F28D 21/00* (2006.01)

(52) U.S. Cl.
CPC .......... *F25J 3/0426* (2013.01); *F25J 3/0429* (2013.01); *F25J 3/044* (2013.01); *F25J 5/005* (2013.01); *F28D 9/0068* (2013.01); *F28D 9/0093* (2013.01); *F25J 2200/72* (2013.01); *F25J 2210/04* (2013.01); *F25J 2210/42* (2013.01); *F25J 2245/02* (2013.01); *F25J 2250/10* (2013.01); *F25J 2290/32* (2013.01); *F28D 2021/0033* (2013.01); *F28D 2021/0066* (2013.01)

(58) Field of Classification Search
CPC ...... F25J 3/04884; F25J 5/005; F25J 2200/72; F25J 2210/42; F25J 2250/10; F25J 2290/32; F25J 2290/40; F28D 2021/0033

See application file for complete search history.

(56) References Cited

U.S. PATENT DOCUMENTS

| | | | | |
|---|---|---|---|---|
| 5,385,024 A | * | 1/1995 | Roberts | F25J 3/04284 62/647 |
| 5,924,308 A | * | 7/1999 | Rathbone | F25J 3/04884 62/643 |
| 2003/0159810 A1 | | 8/2003 | Schweigert et al. | |
| 2017/0227284 A1 | * | 8/2017 | Egoshi | F25J 3/04212 |

FOREIGN PATENT DOCUMENTS

| | | | | |
|---|---|---|---|---|
| EP | 3 184 944 A1 | | 6/2017 | |
| JP | H037879 A | * | 1/1991 | ............ F25J 5/005 |
| JP | 5-280861 | | 10/1993 | |
| JP | 6087326 | | 3/2017 | |
| JP | 2019-174070 | | 10/2019 | |

OTHER PUBLICATIONS

Extended European Search Report dated Sep. 26, 2022 issued in European Application No. 20748573.1 (7 pages).
Office Action dated Nov. 26, 2023 issued in Chinese Application No. 202080010397.6 with English translation (8 pages).

\* cited by examiner

MULTISTAGE LIQUID STORAGE-TYPE CONDENSER-EVAPORATOR AND NITROGEN PRODUCTION DEVICE USING THE SAME

This application is the U.S. national phase of International Application No. PCT/JP2020/002985 filed Jan. 28, 2020 which designated the U.S. and claims priority to JP Application No. 2019-012047 filed Jan. 28, 2019, the entire contents of each of which are hereby incorporated by reference.

TECHNICAL FIELD

The present invention relates to a multistage liquid storage-type condenser-evaporator in which liquid in a liquid storage section provided in at least two evaporation areas is introduced into an evaporation passage, the liquid is evaporated by utilizing thermosiphon action by heat exchange between the liquid and gas flowing through the condensation passage, while the gas is condensed, and a nitrogen production device using the multistage liquid storage-type condenser-evaporator.

BACKGROUND ART

A condenser-evaporator in a nitrogen production device which mainly produces nitrogen exchanges heat between nitrogen gas from an overhead of a distillation column which concentrates nitrogen from air and oxygen enriched liquid air from a bottom of a distillation column, and the nitrogen gas is condensed to produce a reflux fluid in the distillation column.

With the condensation of the nitrogen gas, the oxygen enriched liquid air, which is a refrigerant, evaporates, and a part of it is used to generate cold in the nitrogen production device. In addition, another part of it is used as a part of raw material air or as a raw material of a second distillation column in order to improve the recovery rate of nitrogen.

As such a condenser-evaporator, a condenser-evaporator using a plate fin-type heat exchanger core is usually used. This type of condenser-evaporator has a form in which the heat exchanger core is immersed in the liquid reservoir (liquid storage-type) and a form in which the heat exchanger core is not immersed (dry-type).

In the dry-type condenser-evaporator, oxygen enriched liquid air is supplied into the heat exchange core via a header and completely gasified by heat exchange with nitrogen gas and led out. Therefore, a nitrogen concentration of the led-out gas is equal to a nitrogen concentration of the supplied oxygen enriched liquid air.

On the other hand, in the liquid storage-type condenser-evaporator, the oxygen enriched liquid air stored in the container flows in from the bottom of the heat exchange core immersed by the thermosiphon effect, partly evaporates, and flows out from an upper part of the core in a gas-liquid two-phase state. The evaporated gas is removed from the container and the non-evaporated liquid is returned to the container.

As a result, a nitrogen concentration of the oxygen enriched liquid air led out from a bottom of the container becomes smaller than that of the supplied oxygen enriched liquid air, and a nitrogen concentration of the evaporated gas led out from the container increases. In this way, in the liquid storage-type condenser-evaporator, it is possible to separate the components of the supplied oxygen enriched liquid air.

However, since the oxygen enriched liquid air in the container is led out in the liquid-storage type condenser-evaporator, the amount of nitrogen in the evaporated gas is smaller than that in the dry-type condenser-evaporator. Even if the evaporated gas is used as a part of the raw material air or as a raw material of the second distillation column, the nitrogen recovery rate cannot be improved.

In order to solve such a problem, it is conceivable to use a multistage liquid storage-type condenser-evaporator. For example, Patent Document 1 discloses a multistage liquid storage-type condenser-evaporator including an evaporation passage partitioned into a plurality of stages and a liquid storage section for storing liquid supplied and led out into the evaporation passage.

The action of the multistage liquid storage-type condenser-evaporator disclosed in Patent Document 1 is as follows.

When oxygen enriched liquid air is supplied into a top liquid storage section of the multistage liquid storage-type condenser-evaporator including an evaporation area with two stages, the oxygen enriched liquid air stored in the liquid storage section flows into an evaporation passage from a lower evaporation inflow passage, and the liquid level becomes the same in the liquid storage section and in the evaporation passage.

When nitrogen gas passes through a condensation passage in this state, heat exchange is performed, a part of the oxygen enriched liquid air evaporates to form a gas-liquid two-phase, an ascending flow is generated by the thermosiphon effect, and the oxygen enriched liquid air in a gas-liquid two-phase is led out from the upper evaporation outflow passage as a gas-liquid two-phase. The led-out gas is taken out from an evaporated gas outlet of the liquid storage section. On the other hand, the liquid that has not evaporated returns into the liquid storage section, and a circulating flow is formed between the liquid storage section and the evaporation passage. Due to the evaporation and circulation at this time, the nitrogen concentration of the evaporated gas increases, and the nitrogen concentration of the oxygen enriched liquid air stored in the liquid storage section decreases.

When the liquid level in the liquid storage section rises above the liquid level in the communication introduction passage, the oxygen enriched liquid air with reduced nitrogen concentration flows into the communication passage from the communication introduction passage and is led out from the communication outflow passage, and stored in the next lower liquid storage section. In this stage as well, the oxygen enriched liquid air is evaporated and circulated, and a gas having a lower nitrogen concentration than that of the gas in the upper stage is led out. In this way, two types of gases having different nitrogen concentrations can be produced. The nitrogen recovery rate can be increased by using the evaporative gas having a high nitrogen concentration as a part of the raw material air or as a raw material of the second distillation column.

However, the nitrogen concentration of the oxygen enriched liquid air stored in the bottom liquid storage section is about 30% or less. This decrease in nitrogen concentration raises the boiling point of oxygen enriched liquid air. Therefore, the temperature difference between the fluid flowing in the bottom evaporation passage and the nitrogen flowing in the condensation passage becomes small Therefore, it is desired to increase the temperature difference in the bottom stage.

In addition, in order to make the multistage liquid storage-type condenser-evaporator compact, if the pressure of the oxygen enriched liquid air supplied into the top liquid storage section is reduced, there is a problem in that the power for producing nitrogen increases.

PRIOR ART DOCUMENTS

Patent Literature

Patent Document 1 Japanese Patent No. 6087326

SUMMARY OF INVENTION

Problem to be Solved by the Invention

The present invention has been made to solve such a problem, and an object of the present invention is to provide a compact multistage liquid storage-type condenser-evaporator capable of producing two kinds of gases having different compositions without increasing power, and a nitrogen production device using the multistage liquid storage-type condenser-evaporator without increasing the power for producing nitrogen.

Means for Solving the Problem (1) A multistage liquid storage-type condenser-evaporator including:
  a condensation passage which is configured to communicate in a vertical direction in which gas flows and is condensed;
  an evaporation passage which is configured to be divided into multiple stages in a vertical direction, through which liquid which is evaporated by exchanging heat with the gas flows;
  circulation liquid storage sections which are configured to be provided corresponding to the evaporation passage at each stage except a bottom stage, supply the liquid into the evaporation passage, store the liquid flowing out from the evaporation passage, and circulate the liquid in the evaporation passage at each stage;
  a communication passage which is configured to flow the liquid in the circulation liquid storage section at an upper stage into the circulation liquid storage section at lower stage; and
  a bottom communication passage which is configured to flow liquid in a bottom circulation liquid storage section into a bottom liquid storage section,
  the condensation passage and the evaporation passage are stacked to form a heat exchange section,
  the heat exchange section forms the heat exchanger core, and
  the circulation liquid storage section is formed on at least one side surface in a width direction of the heat exchanger core orthogonal to the stacking direction, corresponding to the number of stages of the evaporation passage,
  wherein the multistage liquid storage-type condenser-evaporator further includes:
  the bottom liquid storage section which is configured to store the liquid supplied into the bottom evaporation passage without circulating, and
  a fluid collection section which is configured to collect the fluid which flows out from the bottom evaporation passage and discharge to the outside without returning into the bottom liquid storage section.

(2) The multistage liquid storage-type condenser-evaporator according to (1), wherein the multistage liquid storage-type condenser-evaporator further includes:
  an evaporated gas outlet which is configured to lead out evaporated gas which is flowed into the circulation liquid storage section;
  a liquid inlet which is configured to introduce liquid from the outside into a top circulation liquid storage section; and
  a liquid outlet which is configured to lead out the liquid which is flowed into the bottom liquid storage section.

(3) The multistage liquid storage-type condenser-evaporator according to (1), wherein the multistage liquid storage-type condenser-evaporator further includes a gas-liquid collection container which is configured to collect the gas which is flowed into the circulation liquid storage section and also serve as the bottom liquid storage section, and the gas-liquid collection container includes a liquid inlet which is configured to introduce liquid from the outside into a top circulation liquid storage section, an evaporated gas outlet which is configured to lead out collected evaporated gas, and a liquid outlet which is configured to lead out stored liquid.

(4) The multistage liquid storage-type condenser-evaporator according to (2) or (3), wherein the multistage liquid storage-type condenser-evaporator further includes a conduit which is configured to supply liquid led out through the liquid outlet into a bottom evaporation passage, and a decompressor provided in the conduit.

(5) The multistage liquid storage-type condenser-evaporator according to any one of (2) to (4), wherein the heat exchanger core is made of a heat exchange section and a liquid communication section, the liquid communication section includes the communication passage and the bottom communication passage, and the liquid communication section is provided on at least one side of the heat exchange section in the stacking direction of the condensation passage and the evaporation passage forming the heat exchange section.

(6) A nitrogen production device including a multistage liquid storage-type condenser-evaporator, first and second distillation columns in which a mixed fluid of oxygen, nitrogen and argon is separated by cryogenic distillation, and an expansion turbine,
  wherein the multistage liquid storage-type condenser-evaporator is the multistage liquid storage-type condenser-evaporator according to any one of (2) to (5), and
  the nitrogen production device further includes:
  a conduit which is configured to introduce at least a part of nitrogen gas from an upper part of the first distillation column into a nitrogen gas introduction pipe of the multistage liquid storage-type condenser-evaporator,
  a conduit which is configured to introduce liquid nitrogen from the condensation passage of the multistage liquid storage-type condenser-evaporator into an upper part of the first distillation column as a reflux liquid,
  a conduit which is configured to introduce at least a part of oxygen enriched liquid air from a lower part of the first distillation column into the liquid inlet of the multistage liquid storage-type condenser-evaporator,
  a conduit which is configured to introduce at least a part of gas led out through the fluid collection section into the expansion turbine as a cold source, and
  a conduit which is configured to introduce a part of gas led out through the evaporated gas outlet as a raw material for the second distillation column.

(7) A nitrogen production device including a multistage liquid storage-type condenser-evaporator, a distillation column in which a mixed fluid of oxygen, nitrogen and argon is separated by cryogenic distillation, and an expansion turbine,
wherein the multistage liquid storage-type condenser-evaporator is the multistage liquid storage-type condenser-evaporator according to any one of (2) to (5), and
the nitrogen production device further includes:
a conduit which is configured to introduce at least a part of nitrogen gas from an upper part of the distillation column into a nitrogen gas introduction pipe of the multistage liquid storage-type condenser-evaporator;
a conduit which is configured to introduce liquid nitrogen from the condensation passage of the multistage liquid storage-type condenser-evaporator into an upper part of the distillation column as a reflux liquid;
a conduit which is configured to introduce oxygen enriched liquid air from a bottom of the distillation column into the liquid inlet of the multistage liquid storage-type condenser-evaporator;
a conduit which is configured to introduce at least a part of gas led out through the fluid collection section into the expansion turbine as a cold source; and
a conduit which is configured to introduce a part of gas let out through the evaporated gas outlet into the distillation column as a part of the raw material air.

Effects of the Invention

The multistage liquid storage-type condenser-evaporator according to the present invention includes the bottom liquid storage section which is configured to store the liquid supplied into the bottom evaporation passage without circulating, and the fluid collection section which is configured to collect the fluid flowing out from the bottom evaporation passage and discharge to the outside without returning into the bottom liquid storage section. Therefore, the liquid does not circulate in the bottom liquid storage section, so that the nitrogen concentration in the liquid does not decrease as in the conventional condenser-evaporator. Compared with the case in which liquid circulates, the temperature difference between the temperature of the fluid in the bottom evaporation region and the nitrogen flowing through the condensation passage can be increased. As a result, it is possible to realize a compact multistage liquid storage-type condenser-evaporator which produces two types of gases having different compositions.

DETAILED DESCRIPTION OF THE PREFERRED EMBODIMENTS

Figure 1:
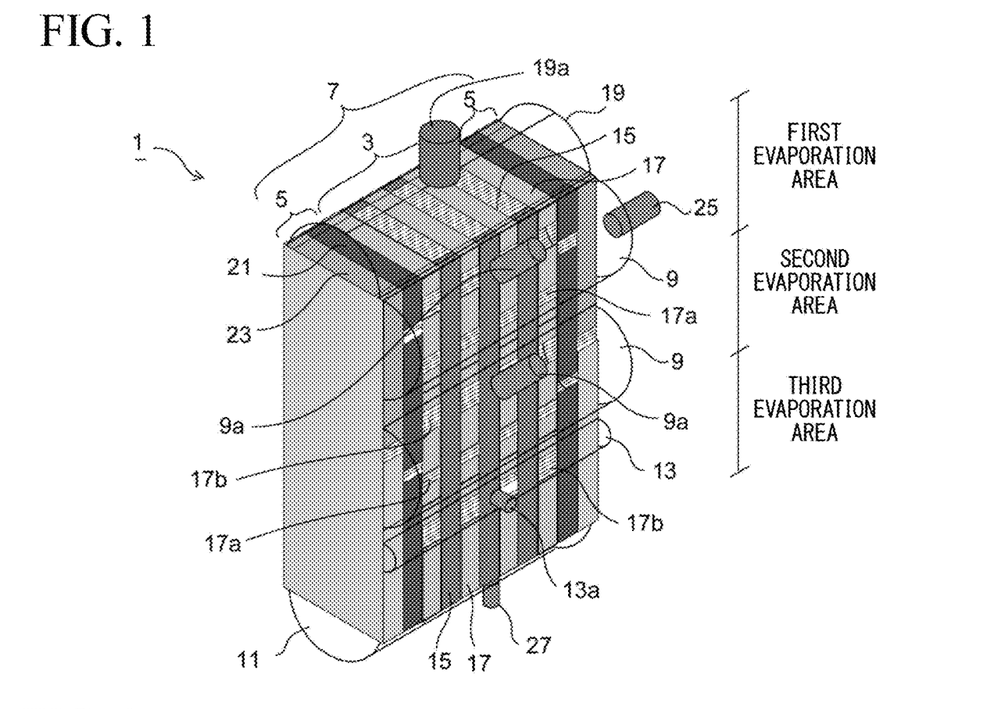
FIG. 1 is a perspective view showing a multistage liquid storage-type condenser-evaporator which is partially transparent according to an embodiment of the present invention.

As shown in FIG. 1, a multistage liquid storage-type condenser-evaporator 1 of the present embodiment includes a heat exchanger core 7 having a heat exchange section 3 and two liquid communication sections 5 provided on both side surfaces of the heat exchange section 3 in the stacking direction, a multi-stage circulation liquid storage section 9 formed on one side of the heat exchanger core 7 in the width direction (hereinafter, simply referred to as "the width direction of the heat exchanger core") orthogonal to the stacking direction of the heat exchange section 3, a bottom liquid storage section 11 provided at the lower end of the heat exchanger core 7, and a fluid collection section 13 which collects fluid flowing out from the bottom evaporation passage 17 and discharges the fluid to the outside without returning into the bottom liquid storage section 11.

The stacking direction of the heat exchange section 3 means a direction in which the condensation passage 15 and the evaporation passage 17, which form the heat exchange section 3, are stacked. The stacking direction of the heat exchange section 3 is also the stacking direction of one liquid communication section 5, the heat exchange section 3, and the other liquid communication section 5.

Further, the width direction of the heat exchanger core 7 is a direction orthogonal to the stacking direction. A plane formed by the stacking direction and the width direction of the heat exchanger core 7 is a horizontal plane with respect to the vertical direction of the multistage liquid storage-type condenser-evaporator.

Hereinafter, each configuration will be described in detail. In the following description, a case in which the multistage liquid storage-type condenser-evaporator 1 is used as a condenser-evaporator in a nitrogen production device which exchanges heat between nitrogen gas and oxygen enriched liquid air to condense nitrogen gas and evaporate the oxygen enriched liquid air will be explained as an example.

<Heat Exchange Section>

In the heat exchange section 3, oxygen enriched liquid air and nitrogen gas are circulated and heat-exchanged with each other to condense the nitrogen gas and evaporate the oxygen enriched liquid air. The heat exchange section 3 is formed by stacking the condensation passage 15 and the evaporation passage 17 adjacent to each other. As shown in FIG. 1, the heat exchange section 3 in the present embodiment is formed by stacking three condensation passages 15 and four evaporation passages 17.

The condensation passage 15 and the evaporation passage 17 are a so-called plate fin type passage which is formed by laminating a plate (tube plate), fins (corrugated fins), sidebars, or the like, similarly to the multistage liquid storage-type condenser-evaporator disclosed in Patent Document 1.

Figure 2:
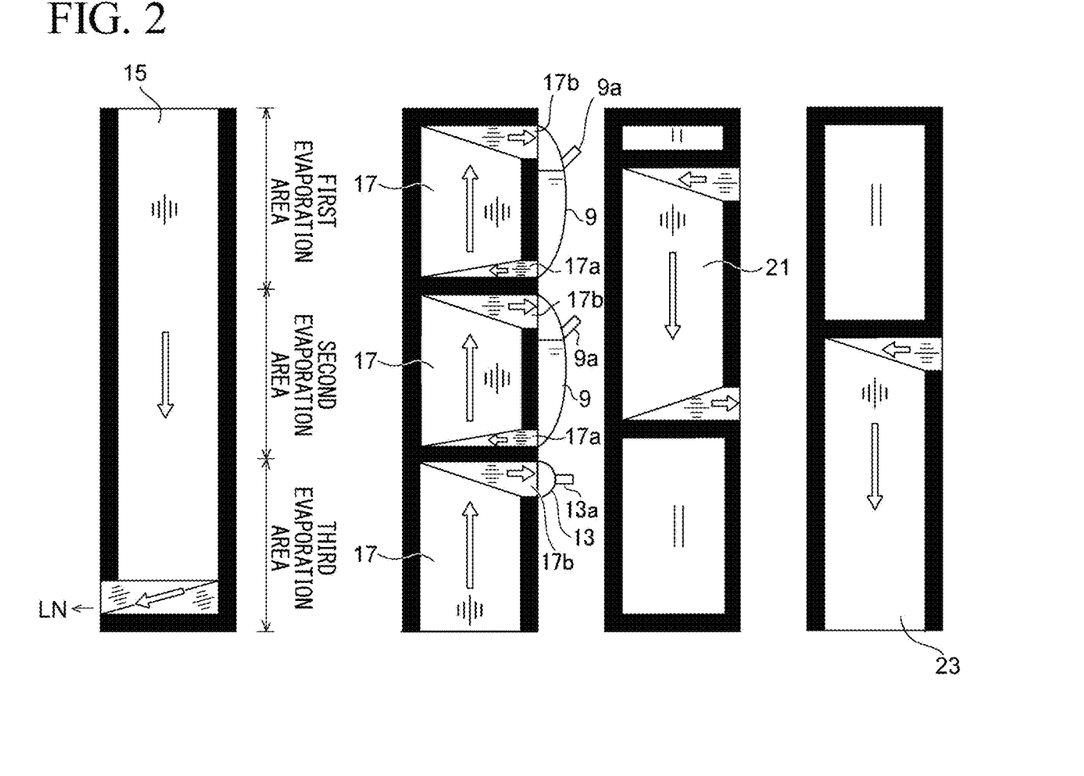
FIG. 2 is a diagram explaining each passage constituting the heat exchanger core according to the embodiment of the present invention.

The condensation passage 15 is formed by using vertically oriented fins. As shown in FIGS. 1 and 2, the flow path of the condensation passage 15 is formed so as to communicate from the upper end surface to the lower end surface of the heat exchanger core 7. Nitrogen gas flows in from the upper end of the condensation passage 15, is cooled while passing through the inside of the condensation passage 15, and is led out as liquid nitrogen from the lower end. At the lower end of the heat exchanger core 7, a liquid nitrogen outlet (not shown) for leading out the liquid nitrogen condensed in the condensation passage 15 is provided.

As shown in FIGS. 1 and 2, the evaporation passage 17 is independently provided for each of the three evaporation areas of the first evaporation area to the third evaporation area. The evaporation passage 17 is formed by arranging fins (horizontal fins) along the width direction of the heat exchanger core 7 and fins (vertical fins) vertically so as to communicate with the horizontal fins.

As shown in FIG. 2, the oxygen enriched liquid air stored in the circulation liquid storage section 9 flows in the evaporation inflow passage 17a which is the lower horizontal fins, ascends while evaporating along the vertical fins, flows in the evaporation outflow passage 17b which is the upper horizontal fins in the state of a gas-liquid two-phase fluid, and returned into the circulation liquid storage section 9.

In addition, the oxygen enriched liquid air stored in the bottom liquid storage section 11 ascends in the bottom evaporation passage 17 while evaporating, almost all thereof evaporates to become evaporated gas, is collected in the fluid collection section 13 and led out to the outside.

As shown in FIG. 1, a nitrogen gas header 19 for distributing and supplying nitrogen gas to a plurality of the condensation passages 15 is provided at the upper end of the heat exchanger core 7, and the nitrogen gas header 19 is provided with a nitrogen gas introduction pipe 19a.

<Liquid Communication Section>

The liquid communication section 5 includes a communication passage 21 for flowing the liquid in the circulation liquid storage section 9 from the upper circulation liquid storage section 9 into the lower circulation liquid storage section 9, and a bottom communication passage 23 for flowing the liquid in the bottom circulation liquid storage section 9 into the bottom liquid storage section 11. The liquid communication section 5 is formed by plates and fins. The liquid communication section 5 is provided on both side surfaces of the heat exchange section 3 in the stacking direction of the heat exchange section 3.

As shown in FIG. 1, the communication passage 21 is provided on the side surfaces of the heat exchange section 3, and the bottom communication passage 23 is provided further outside thereof.

In FIG. 2, the liquid communication section is provided with double lines at a total of three places. This double line means that the liquid does not pass through it.

Further, the liquid communication section 5 of the present embodiment is formed by plates and fins, and is provided on both sides of the heat exchanger core 7 in the stacking direction. However, it is not essential that the liquid communication section 5 in the present invention be provided integrally with the heat exchanger core 7. Apart from the heat exchanger core 7, the liquid communication section 5 may be, for example, a pipe connecting each the circulation liquid storage section 9 and the bottom liquid storage section 11.

The communication passage 21 is a passage for flowing the liquid in the circulation liquid storage section 9 in the first stage into the circulation liquid storage section 9 in the second stage. The bottom communication passage 23 is a passage for flowing the liquid in the circulation liquid storage section 9 at the bottom, that is, in this example, the circulation liquid storage section 9 in the second stage into the bottom liquid storage section 11.

<Circulation Liquid Storage Section>

The circulation liquid storage section 9 is provided corresponding to the evaporation passage 17 of each stage except the evaporation passage at the bottom. The circulation liquid storage section 9 supplies liquid into the evaporation passage 17, stores the liquid flowing out from the evaporation passage 17, and circulates the liquid in the evaporation passage 17 of each stage.

The circulation liquid storage section 9 is provided on one side or both sides in the width direction of the heat exchanger core 7.

The circulation liquid storage section 9 of the present embodiment is provided with an evaporated gas outlet 9a.

Further, the top circulation liquid storage section 9 is provided with a liquid inlet 25 for introducing oxygen enriched liquid air from the outside.

<Bottom Liquid Storage Section>

The bottom liquid storage section 11 is for supplying the liquid into the bottom evaporation passage 17, and the liquid does not return from the bottom evaporation passage 17 into the bottom liquid storage section 11. The bottom liquid storage section 11 is provided at the lower end of the heat exchanger core 7. The bottom liquid storage section 11 is provided with a liquid outlet 27 for leading out the liquid to the outside.

<Fluid Collection Section>

The fluid collection section 13 collects the fluid (mainly evaporated gas) flowing out from the bottom evaporation passage 17 and discharges the fluid to the outside without returning into the bottom liquid storage section 11. The fluid collection section 13 is provided with a fluid outlet 13a.

In the multistage liquid storage-type condenser-evaporator disclosed in Patent Document 1, liquid is circulated in all liquid storage sections including the bottom liquid storage section, and an evaporated gas outlet is provided in all circulation liquid storage sections.

On the other hand, in the present embodiment, the bottom liquid storage section 11 does not circulate the liquid, so that the evaporated gas cannot be collected. Therefore, the fluid collection section 13 independent of the bottom liquid storage section 11 is provided in the third evaporation area.

[Operation Explanation]

A method of heat exchange between nitrogen gas and oxygen enriched liquid air using the multistage liquid storage-type condenser-evaporator 1 having the above configuration will be described together with the operation of the multistage liquid storage-type condenser-evaporator 1.

Oxygen enriched liquid air is supplied from the outside and stored in the top circulation liquid storage section 9 via the liquid inlet 25. In the lower liquid storage section, the oxygen enriched liquid air is supplied via the communication passage 21, and stored. In the bottom liquid storage section 11, the oxygen enriched liquid air is supplied via the bottom communication passage 23, and stored.

On the other hand, nitrogen gas is introduced into the condensation passage 15 via the nitrogen gas header 19.

The oxygen enriched liquid air stored in the circulation liquid storage section 9 flows into the evaporation passage 17 by the head pressure, and thereby the liquid level becomes the same in the circulation liquid storage section 9 and the evaporation passage 17. Also in bottom liquid storage section 11, the oxygen enriched liquid air is stored, and the liquid level reaches a predetermined height of the evaporation passage 17.

When the nitrogen gas passes through the condensation passage 15 in this state, heat is exchanged between the nitrogen gas in the condensation passage 15 and the oxygen enriched liquid air in the evaporation passage 17, and a part of the oxygen enriched liquid air evaporates and vaporizes to become evaporated gas. The oxygen enriched liquid air in the evaporation passage 17 is in a gas-liquid mixed state (gas-liquid two-phase fluid). Since there is a difference in density between the oxygen enriched liquid air in the gas-liquid mixed state in the evaporation passage 17 and the oxygen enriched liquid air in the circulation liquid storage section 9, an ascending flow is generated in the evaporation passage 17, and a gas-liquid two-phase fluid flows out from the evaporation outflow passage 17b. The outflown evaporated gas is led out from the evaporated gas outlet 9a of the circulation liquid storage section 9. The oxygen enriched liquid air which has not evaporated returns into the circulation liquid storage section 9, and a circulating flow is formed between the circulation liquid storage section 9 and the evaporation passage 17 (thermosiphon action). At this time, the nitrogen concentration of the evaporated gas led out is higher than the nitrogen concentration of the oxygen enriched liquid air supplied from the outside, and is higher than the nitrogen concentration of the circulating flow introduced into the evaporation passage 17.

In the bottom liquid storage section 11, since no circulating flow is generated, the fluid which has ascended in the evaporation passage 17 is collected in the fluid collection section 13 and discharged to the outside from the fluid outlet 13a.

As described above, since the liquid circulation does not occur in the bottom liquid storage section 11, the nitrogen concentration of the fluid ascending in the evaporation passage 17 does not decrease, and the temperature difference between the nitrogen flowing in the condensation passage 15 and the oxygen enriched liquid air flowing in the evaporation passage 17 can be made larger than that in the conventional condenser-evaporator.

When the liquid level of the circulation liquid storage section 9 becomes equal to or higher than the height of the inlet to the communication passage 21, the oxygen enriched liquid air flows into the communication passage 21 and is stored in the lower circulation liquid storage section 9.

Similarly, in the bottom circulation liquid storage section 9, when the liquid level exceeds the height of the inlet to the bottom communication passage 23, the oxygen enriched liquid air flows into the bottom communication passage 23 and is stored in the bottom liquid storage section 11.

On the other hand, while passing through the condensation passage 15, the nitrogen gas exchanges heat with the oxygen enriched liquid air in the adjacent evaporation passage 17, is condensed (liquefied), descends, and is led out from the lower end of the condensation passage 15 through the liquid nitrogen outlet.

In the multistage liquid storage-type condenser-evaporator disclosed in Patent Document 1 (U.S. Pat. No. 6,087,326), the liquid circulates between the inlet and the outlet of the evaporation passage 17 in all liquid storage sections including the bottom liquid storage section 11.

On the other hand, in the multistage liquid storage-type condenser-evaporator of the present embodiment, the liquid does not flow into the bottom liquid storage section 11 from the bottom evaporation passage, that is, the liquid is not circulated. The bottom liquid storage section 11 has the same structure as that of the dry-type condenser-evaporator. The oxygen enriched liquid air is supplied into the bottom liquid storage section 11 via the bottom communication passage 23, flows into the evaporation inflow passage which is formed at the bottom of the evaporation passage 17, completely evaporates, flows out from the fluid collection section 13, and is led out.

As described above, the oxygen enriched liquid air does not circulate in the bottom liquid storage section 11, so that the nitrogen concentration does not decrease. Therefore, the temperature difference between the nitrogen flowing through the condensation passage 15 and the oxygen enriched liquid air can be increased as compared with the case of circulation.

Figure 3:
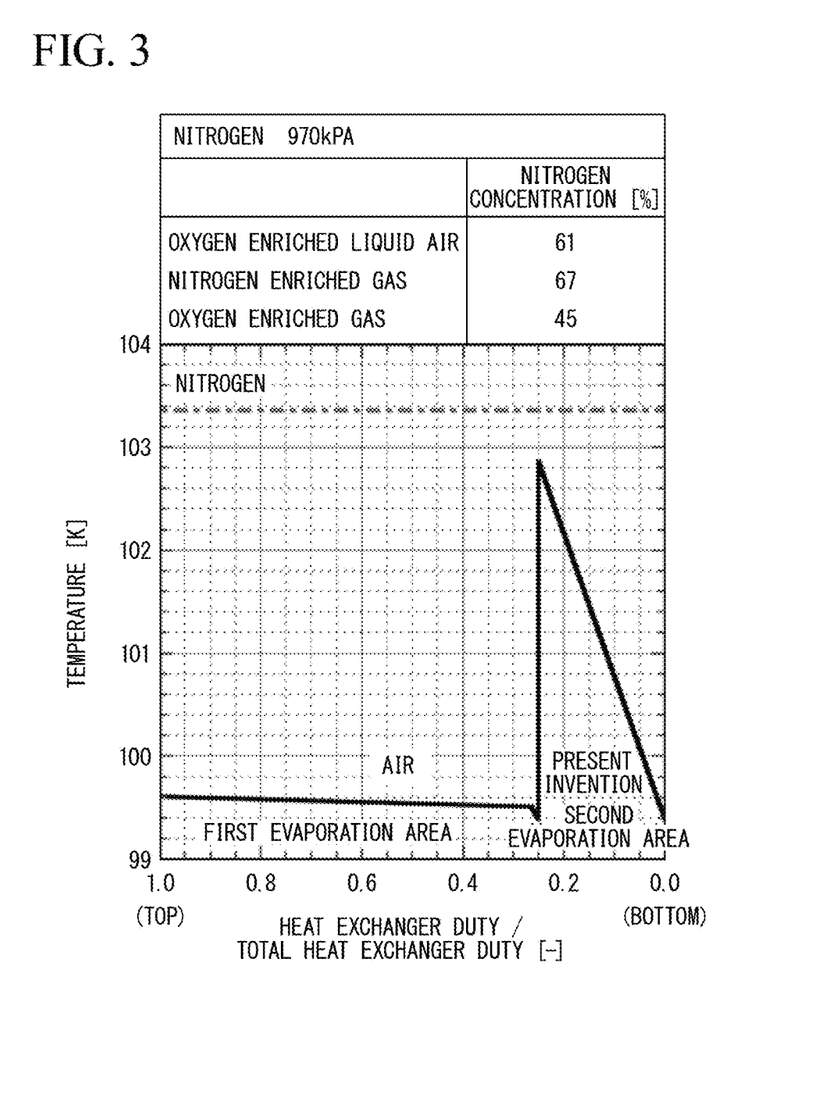
FIG. 3 is a diagram explaining effects of the present invention, and is a graph showing a temperature change of oxygen enriched liquid air when the multistage liquid storage-type condenser-evaporator of the present invention has two stages.

FIG. 3 is a QT diagram of a multistage liquid storage-type condenser-evaporator having a two-stage evaporation area. Nitrogen gas flows in from the top at the dew point, condenses and flows out from the bottom at the boiling point. Since there is almost no difference between the dew point and the boiling point in nitrogen, the temperature is constant. In the following description, the same parts as those of the three-stage multistage liquid storage-type condenser-evaporator shown in FIG. 1 are designated by the same reference numerals as those used in FIG. 1.

The oxygen enriched liquid air flows into the circulation liquid storage section 9 of the first evaporation area at a nitrogen concentration of 61%, flows into the lower part of the evaporation passage 17 from the lower part of the circulation liquid storage section 9, ascends due to the slight temperature rise while evaporating, and flows into the circulation liquid storage section 9 in the gas-liquid two-phase state. Inflowing gas in the gas-liquid two-phase state is led out from the evaporated gas outlet 9a. Meanwhile, liquid in the gas-liquid two-phase state is returned into the circulation liquid storage section 9. As a result, the nitrogen concentration of the led-out gas (nitrogen enriched gas) increases to 67%, and the nitrogen concentration of the oxygen enriched liquid air in the circulation liquid storage section 9 decreases to 45%.

The liquid in the circulation liquid storage section 9 is supplied into the bottom liquid storage section 11 via the bottom communication passage 23. Then, the liquid flows into the evaporation inflow passage which is formed at the bottom of the evaporation passage 17 in the second evaporation area, completely evaporates, and is led out through the fluid collection section 13. Therefore, the nitrogen concentration of the led-out gas (oxygen enriched gas) is equal to the nitrogen concentration of 45% of the oxygen enriched liquid air in circulation liquid storage section 9. Further, the temperature of the evaporation passage 17 in the second evaporation area is equal to the oxygen enriched liquid air temperature of the bottom circulation liquid storage section 9, and rises to the dew point with evaporation.

Figure 4:
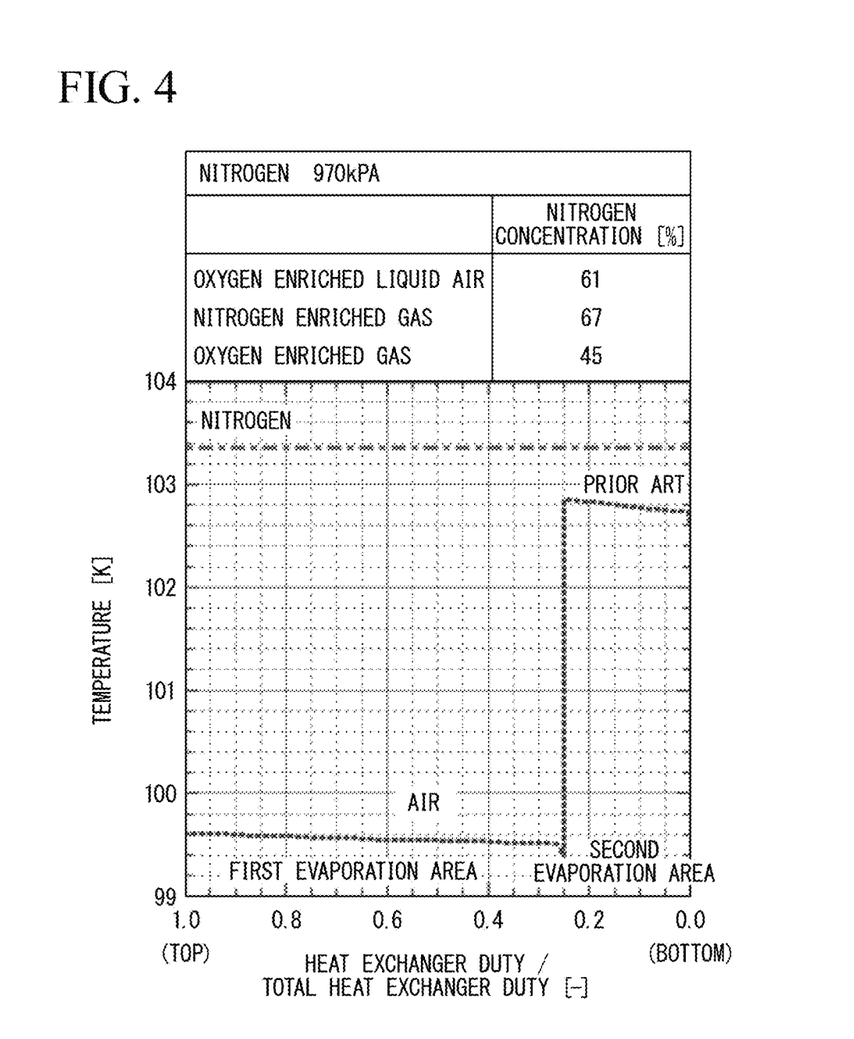
FIG. 4 is a graph showing a temperature change of oxygen enriched liquid air in a conventional two-stage condenser-evaporator.

On the other hand, in the conventional condenser-evaporator, as shown in FIG. 4, the nitrogen concentration of the oxygen enriched liquid air supplied from the lower part of the evaporation passage 17 is reduced to 24% by evaporation and circulation in the second evaporation area. As the boiling point rises, the temperature rises, and the temperature difference between the nitrogen flowing through the condensation passage 15 and the oxygen enriched liquid air becomes smaller.

Figure 5:
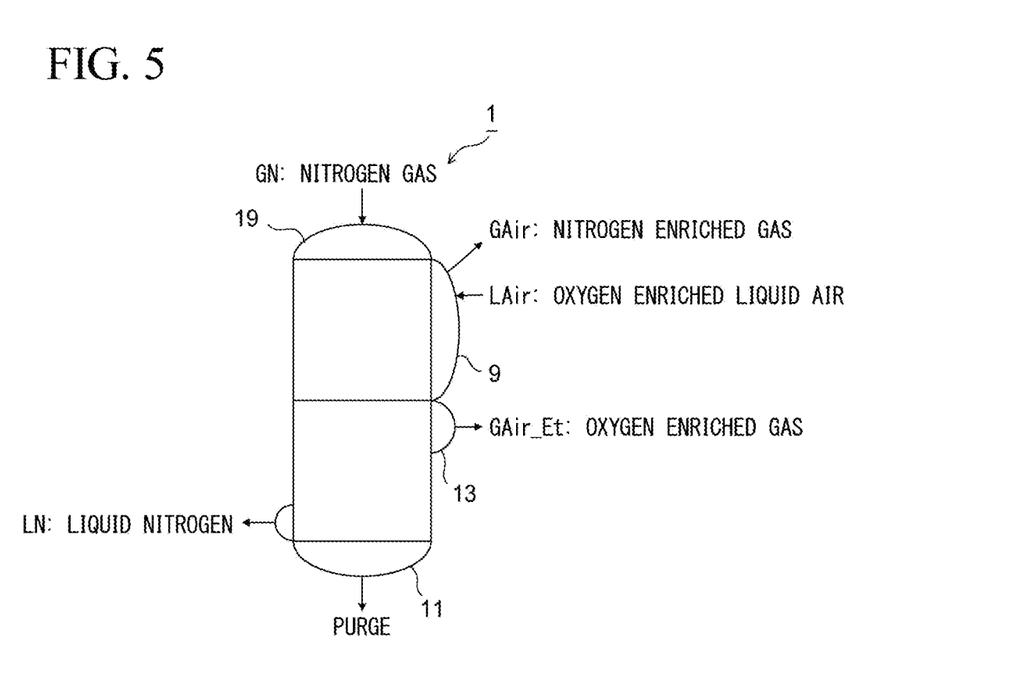
FIG. 5 is a diagram showing an inflow and an outflow of fluid in a multistage liquid storage-type condenser-evaporator in which a circulation liquid storage section includes an evaporated gas outlet for leading evaporated gas, a liquid inlet for introducing liquid from the outside, and a liquid outlet for leading out liquid in a bottom liquid storage section.

FIG. 5 is a diagram showing an inflow and an outflow of fluid in the multistage liquid storage-type condenser-evaporator including the circulation liquid storage section 9 including an evaporated gas outlet for leading out evaporated gas (GAir: nitrogen enriched gas), a liquid inlet for introducing liquid (LAir: oxygen enriched liquid air) from the outside, and a liquid outlet for leading out (purging) the liquid in the bottom liquid storage section 11.

Figure 6:
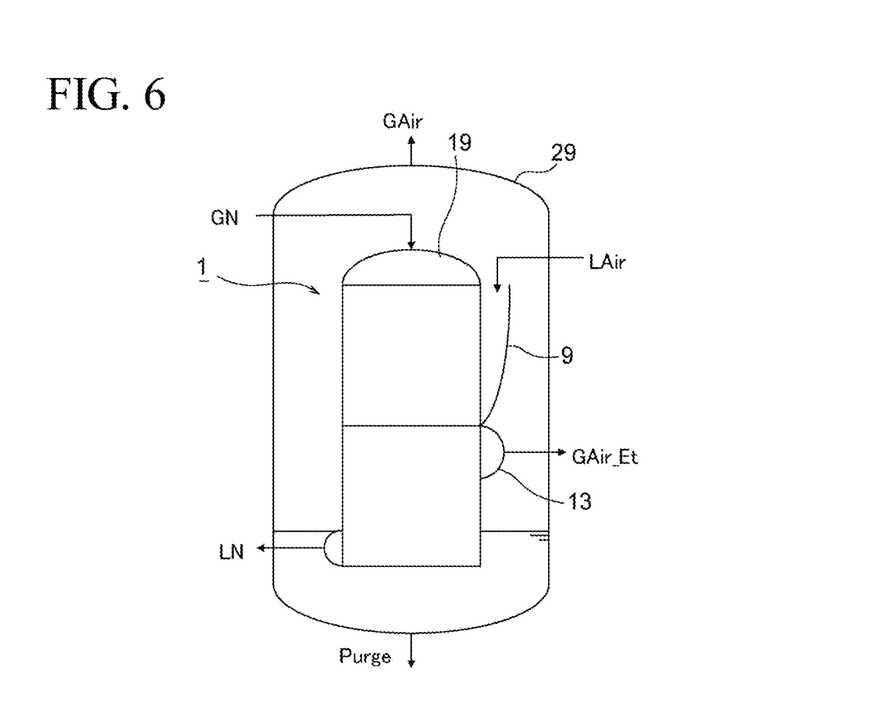
FIG. 6 is a diagram showing an inflow and an outflow of fluid in a multistage liquid storage-type condenser-evaporator equipped with a gas-liquid collection container.

FIG. 6 is a diagram showing an inflow and an outflow of fluid in the multistage liquid storage-type condenser-evaporator including a gas-liquid collection container 29 which collects the gas which has flowed into the circulation liquid storage section 9 and also serves as a bottom liquid storage section 11, and an evaporated gas outlet for leading out evaporated gas (GAir) collected in the gas-liquid collection container 29, wherein the gas-liquid collection container 29 includes a liquid outlet for leading out (purging) liquid stored in the gas-liquid collection container 29 and a liquid inlet for introducing liquid (LAir) into the circulation liquid storage section 9. In the multistage liquid storage-type condenser-evaporator shown in FIG. 6, the evaporation liquid storage section 9 is not provided with the evaporated gas outlet 9a. The upper end of the side wall forming the circulation liquid storage section 9 is not in contact with the evaporation passage 17. Therefore, the gas from the evaporation passage 17 is introduced directly into the gas-liquid collection container 29 from the opening of the circulation liquid storage section 19.

The liquid led out through the liquid outlet of the bottom liquid storage section may be depressurized and supplied into the bottom evaporation passage 17.

Figure 7:
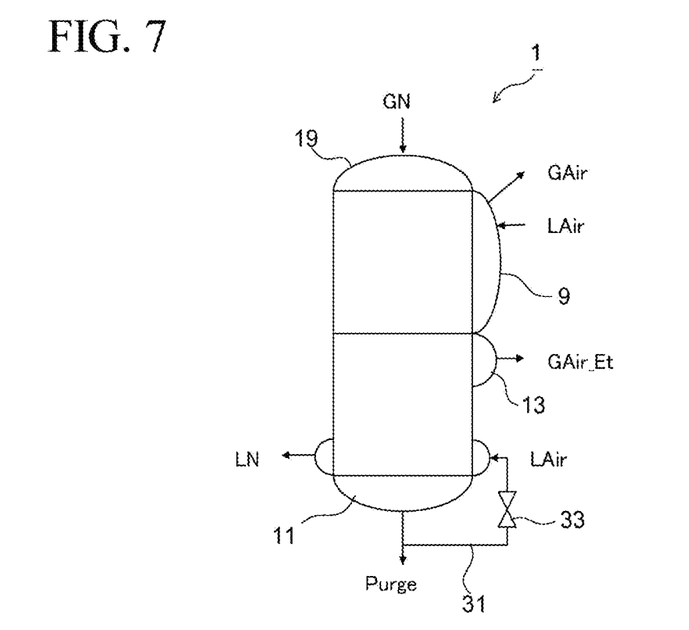
FIG. 7 is a diagram showing a configuration for depressurizing liquid in a bottom liquid storage section in the multistage liquid storage-type condenser-evaporator shown in FIG. 5.

FIG. 7 shows a case in which the liquid led out through the liquid outlet of the bottom liquid storage section is depressurized and supplied into the bottom evaporation passage 17 in the multistage liquid storage-type condenser-evaporator shown in FIG. 5. As shown in FIG. 7, a pipe 31 connecting between the liquid outlet 27 and the inlet of the evaporation passage 17 of the bottom evaporation area is provided, and a pressure reducing valve 33 is provided in the pipe 31. Further, similarly to the evaporation passage at the first evaporation area, the evaporation passage at the second evaporation area is made by an evaporation inflow passage which is a horizontal fin at the lower part, vertical fins, and an evaporation outflow passage which is a horizontal fin at the upper part.

Figure 8:
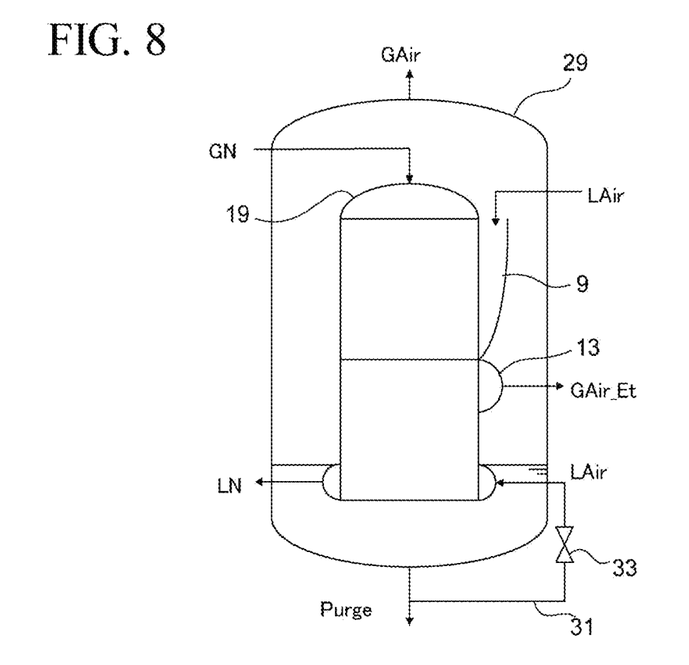
FIG. 8 is a diagram showing a configuration for depressurizing liquid in a bottom liquid storage section in the multistage liquid storage-type condenser-evaporator shown in FIG. 6.

FIG. 8 shows a case in which the liquid led out through the liquid outlet of the gas-liquid collection container 29 is depressurized and supplied into the bottom evaporation passage 17 in the multistage liquid storage-type condenser-evaporator shown in FIG. 6. As shown in FIG. 8, a pressure reducing valve 33 is provided in the pipe 31 provided with the liquid outlet of the gas-liquid collection container 29. In FIG. 8, the same parts as those in FIG. 7 are designated by the same reference numerals.

Figure 9:
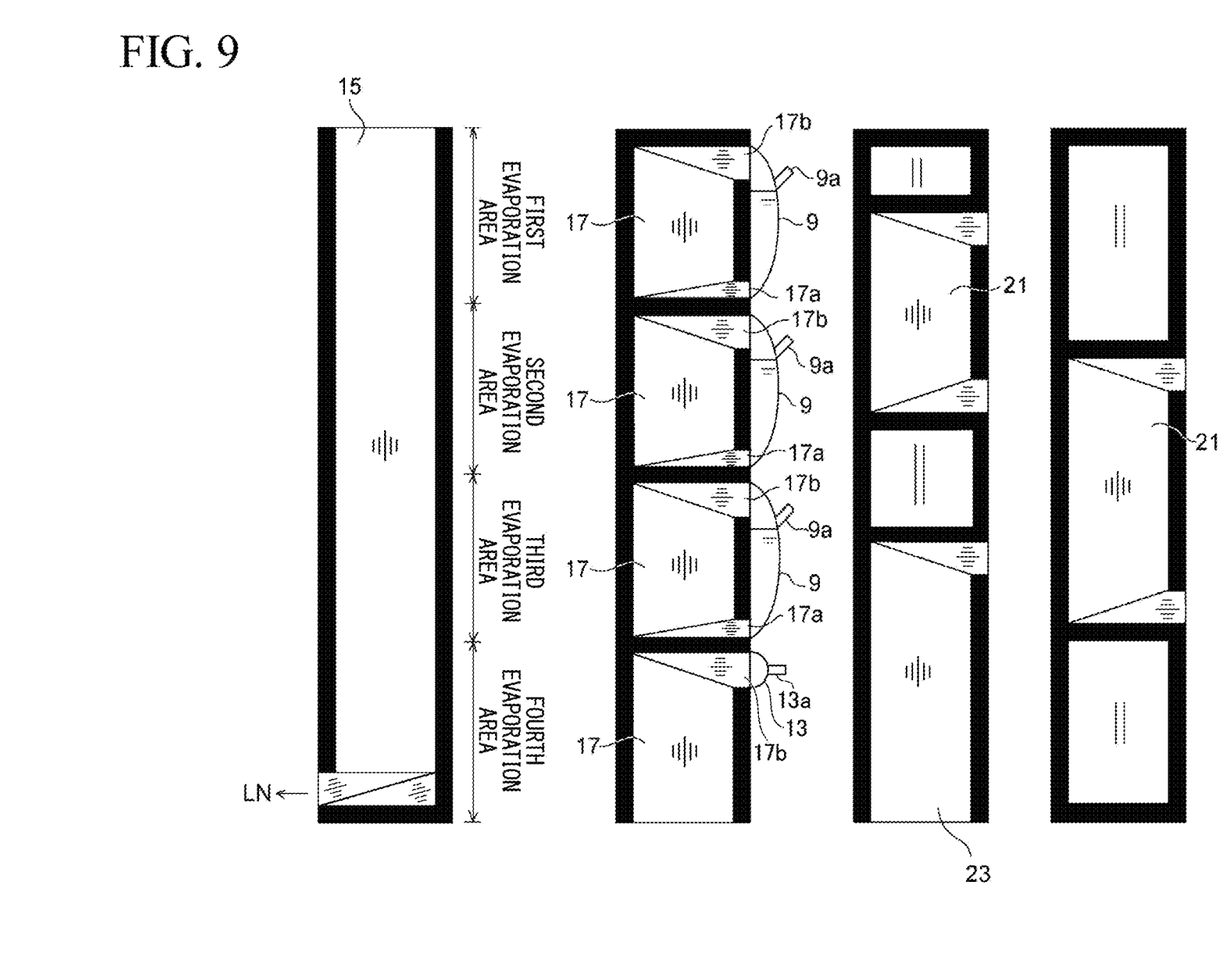
FIG. 9 is a diagram showing each passage constituting a heat exchanger core when the multistage liquid storage-type condenser-evaporator of the present invention has four stages.

The evaporation region shown in FIGS. 1 and 2 has three stages, an odd number of stages. When the evaporation region has four stages, an even number, each passage constituting the heat exchanger core 7 is shown in FIG. 9. In FIG. 9, the same parts as those in FIG. 2 are designated by the same reference numerals as those in FIG. 2.

Next, a nitrogen production device using the multistage liquid storage-type condenser-evaporator 1 will be described.

(Nitrogen Production Device)

First Embodiment

Figure 10:
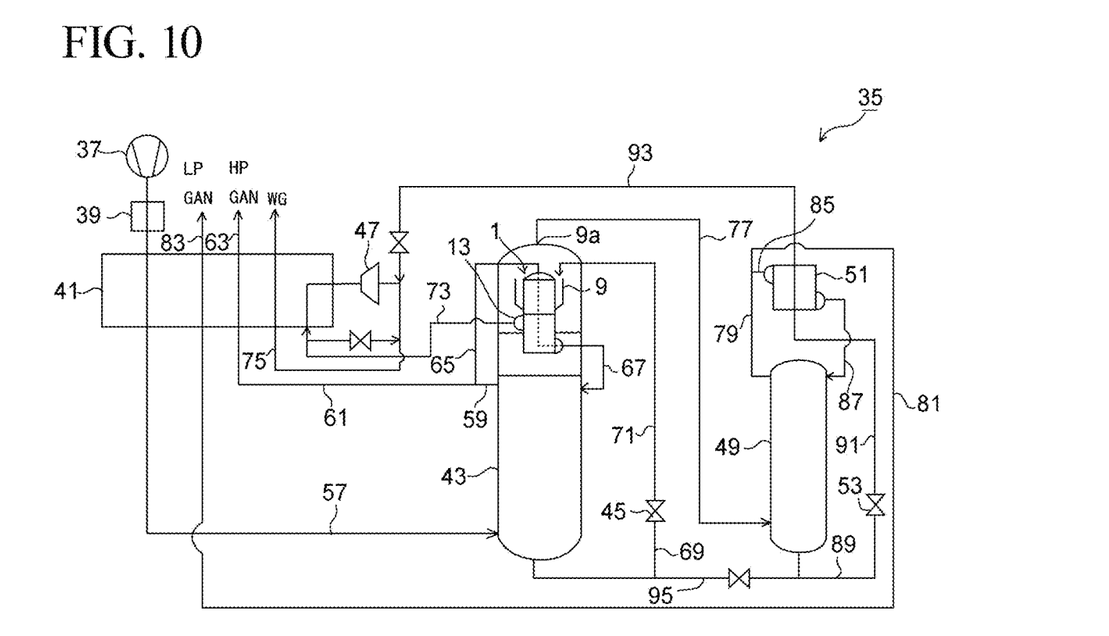
FIG. 10 is a schematic view showing a nitrogen production device using a multistage liquid storage-type condenser-evaporator, which is an embodiment of the present invention.

FIG. 10 shows an embodiment in which the multistage liquid storage-type condenser-evaporator 1 is used as a condenser-evaporator of a nitrogen production device which produces nitrogen from air.

The nitrogen production device 35 of this embodiment includes a multistage liquid storage-type condenser-evaporator 1 including the gas-liquid collection container 29 shown in FIG. 6.

The nitrogen production device 35 of the present embodiment uses at least a part of the gas led out from the fluid collection section 13 through the fluid outlet 13a as a cold source, and a part of the gas led out through the opening of the circulation liquid storage section 9 and an evaporation gas outlet 9a provided in the gas-liquid collection container 29 is used as a raw material for the second distillation column 49.

Hereinafter, the nitrogen production device 35 of the present embodiment will be specifically described with reference to FIG. 10.

Raw material air is pressurized to a predetermined pressure by the raw material air compressor 37, and then carbon dioxide, water vapor, and trace amounts of other impurities in the raw material air are removed in the pretreatment facility 39.

The raw material air from which impurities have been removed is cooled by a low-temperature gas described later in the main heat exchanger 41, introduced into the distillation column 43 by a conduit 57 of which a first end (one end) is connected to the raw material air compressor 37 and a second end (the other end) is connected to a lower part of the distillation column 43. The raw material air ascends in the distillation column 43, is distilled with a descending liquid described later, the nitrogen component is condensed in the upper part of the distillation column 43, and oxygen enriched liquid air in which the oxygen component is concentrated is collected in the lower part of the distillation column 43.

The nitrogen gas in which the nitrogen component is concentrated is led out from a conduit 59 of which a first end is connected to an upper part of the distillation column 43, and a part of the nitrogen gas is introduced through a conduit 61 into the main heat exchanger 41 to heat exchange with the raw material air, the temperature of the nitrogen gas is raised, and the nitrogen gas is collected as a product nitrogen gas from the conduit 63.

On the other hand, the remaining nitrogen gas in which the nitrogen component is concentrated is introduced into the condensation passage 15 of the multistage liquid storage-type condenser-evaporator 1 through a conduit 65 of which a first end is connected to the conduit 59 and a second end is connected to the nitrogen gas introduction pipe 19a provided in the nitrogen gas header 19 of the multistage liquid storage-type condenser-evaporator 1. The nitrogen gas is condensed by heat exchange with an oxygen enriched liquid air described later. Then, the condensed liquid nitrogen is introduced into the distillation column 43 through a conduit 67 of which a first end is connected to the liquid outlet 27 and a second end is connected to the upper part of the distillation column 43, and becomes the descending liquid in the distillation column 43.

Most of the oxygen enriched liquid air in the lower part of the first distillation column 43 is led out into a conduit 69 of which a first end is connected to the bottom of the distillation column 43 and a second end is connected to a pressure reducing valve 45, and depressurized by the pressure reducing valve 45. Then, the depressurized oxygen enriched liquid air is introduced into the multistage liquid storage-type condenser-evaporator 1 through a conduit 71 of which a first end is connected to the pressure reducing valve 45 and a second end is connected to the liquid inlet 25 of the multistage liquid storage-type condenser-evaporator 1. The oxygen enriched liquid air introduced into the multistage liquid storage-type condenser-evaporator 1 is vaporized by heat exchange with the nitrogen gas described above. Then, a part of the evaporated gas, that is, the gas having a low nitrogen concentration, which flows in the bottom evaporation passage 17 and is collected in the fluid collection section 13 is led out as waste gas for a cold source by a conduit 73, of which a first end is connected to the fluid outlet 13$a$ of the fluid collection section 13 and a second end is connected to an expansion turbine 47, is heated by the main heat exchanger 41, and introduced into the expansion turbine 47.

The waste gas which has generated cold required for the device in the expansion turbine 47 is introduced into the main heat exchanger 41 by a conduit 75, cools the raw material air, and reaches room temperature.

Components other than liquid contained in the oxygen enriched liquid air introduced in the multistage liquid storage-type condenser-evaporator 1, that is, evaporated gas led out from the opening of circulation liquid storage section 9, is once introduced into the gas-liquid collection container 29, led out through the conduit 77, of which a first end is connected to the evaporated gas outlet 9$a$ provided at the upper part of the gas-liquid collection container 29 and a second end is connected to the lower part of the second distillation column 49, as an exhaust gas for improving the nitrogen recovery rate having a high nitrogen concentration, and introduced into the lower part of the second distillation column 49 as a raw material gas.

The gas introduced into the lower part of the second distillation column 49 ascends in the second distillation column 49, by distillation with the descending liquid described later, the nitrogen component is concentrated in the upper part of the second distillation column 49 and the oxygen enriched liquid air in which oxygen components are concentrated is collected in the lower part of the second distillation column 49.

The nitrogen gas in which the nitrogen component is concentrated is led out through a conduit 79 of which a first end is connected to the upper part of the second distillation column 49 and a second end is connected to a conduit 81 described later. A portion of the nitrogen gas is then introduced into the main heat exchanger 41 via the conduit 81. Therefore, the temperature of the nitrogen gas is raised by heat exchange with the raw material air, and the nitrogen gas is collected from a conduit 83 as a second product nitrogen gas.

On the other hand, the remaining nitrogen gas with concentrated nitrogen components led out through the conduit 79 is introduced into the condenser-evaporator 51 via a conduit 85 branched from the conduit 79, and condensed by heat exchange with oxygen enriched liquid air described later. Next, the condensed nitrogen gas is introduced into the second distillation column 49 through a conduit 87 of which a first end is connected to the condenser-evaporator 51 and a second end is connected to the upper part of the second distillation column 49, and becomes a descending liquid.

The oxygen enriched liquid air in the lower part of the second distillation column 49 is led out into a conduit 89 of which a first end is connected to the bottom of the second distillation column 49 and a second end is connected to the pressure reducing valve 53, and then the pressure thereof is reduced by the pressure reducing valve 53. The oxygen enriched liquid air is then introduced into the condenser-evaporator 51 through a conduit 91 of which a first end is connected to the pressure reducing valve 53 and a second end is connected to the condenser-evaporator 51. The oxygen enriched liquid air introduced into the condenser-evaporator 51 is vaporized by heat exchange with the nitrogen gas described above, and then joins the waste gas from the expansion turbine 47 described above through a conduit 93.

As a part of the cold required for the second distillation column 49, a part of the oxygen enriched liquid air which is led out through a conduit 95 of which a first end is connected to the bottom of the distillation column 43 is used.

In this embodiment, a part of the oxygen enriched liquid air in the lower part of the distillation column 43 becomes an exhaust gas containing a large amount of nitrogen compositions by the multistage liquid storage-type condenser-evaporator 1, and is supplied as a raw material gas for the second distillation column 49. Therefore, the nitrogen recovery rate of the second distillation column 49 is improved.

Second Embodiment

Figure 11:
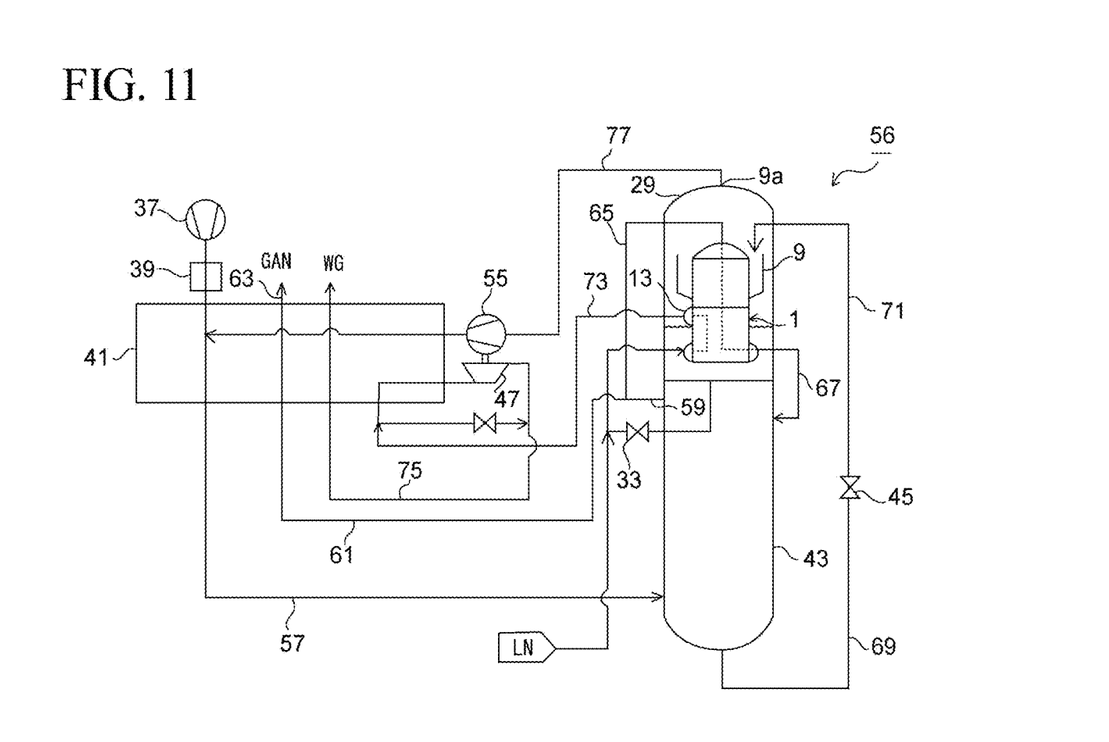
FIG. 11 is a schematic view showing a nitrogen production device using a multistage liquid storage-type condenser-evaporator, which is another embodiment of the present invention.

Hereinafter, a nitrogen production device of a second embodiment will be specifically described with reference to FIG. 11. In FIG. 11, the same parts as those in FIG. 10 are designated by the same reference numerals.

The nitrogen production device 56 of the present embodiment includes a multistage liquid storage-type condenser-evaporator including the gas-liquid collection device 29 shown in FIG. 8.

The nitrogen production device 56 of the present embodiment uses at least a part of the gas led out from the fluid collection section 13 through the opening of the circulation liquid storage section 9 and an evaporation gas outlet 9$a$ provided in the gas-liquid collection container 29 as a part of the raw material air.

Raw material air is pressurized to a predetermined pressure by the raw material air compressor 37, and then carbon dioxide, water vapor, and trace amounts of other impurities in the raw material air are removed in the pretreatment facility 39. The raw material air from which impurities have been removed is cooled by a low-temperature gas described later in the main heat exchanger 41, and introduced into the distillation column 43 by the conduit 57 of which the first end (one end) is connected to the raw material air compressor 37 and the second end (the other end) is connected to the lower part of the distillation column 43. The raw material air ascends in the distillation column 43, is distilled with a descending liquid described later, the nitrogen component is condensed in the upper part of the distillation column 43, and oxygen enriched liquid air in which the oxygen component is concentrated is collected in the lower part of the distillation column 43.

The nitrogen gas in which the nitrogen component is concentrated is led out from the conduit 59 of which the first end is connected to an upper part of the distillation column 43, a part of the nitrogen gas is introduced through the conduit 61 into the main heat exchanger 41 to heat exchange with the raw material air, the temperature of the nitrogen gas is raised, and the nitrogen gas is collected as a product nitrogen gas from the conduit 63.

On the other hand, the remaining nitrogen gas in which the nitrogen component is concentrated is introduced into the condensation passage 15 of the multistage liquid storage-type condenser-evaporator 1 through the conduit 65 of which the first end is connected to the conduit 59 and the second end is connected to the nitrogen gas introduction pipe 19a provided in the nitrogen gas header 19 of the multistage liquid storage-type condenser-evaporator 1. The nitrogen gas is condensed by heat exchange with an oxygen enriched liquid air described later. Then, the condensed liquid nitrogen is introduced into the distillation column 43 through the conduit 67 of which the first end is connected to the liquid outlet 27 and the second end is connected to the upper part of the distillation column 43, and becomes the descending liquid in the distillation column 43.

The oxygen enriched liquid air in the lower part of the distillation column 43 is led out into the conduit 69 of which the first end is connected to the bottom of the distillation column 43 and the second end is connected to the pressure reducing valve 45, and depressurized by the pressure reducing valve 45. Then, the depressurized oxygen enriched liquid air is introduced into the multistage liquid storage-type condenser-evaporator 1 through the conduit 71, of which a first end is connected to the pressure reducing valve 45 and the second end is connected to the liquid inlet 25 of the multistage liquid storage-type condenser-evaporator 1, and the opening of the circulation liquid storage section 9. A part of the oxygen enriched liquid air introduced into the multistage liquid storage-type condenser-evaporator 1 is evaporated in the top evaporation passage 17 by heat exchange with the nitrogen gas described above. The oxygen enriched liquid air which has not evaporated is stored in the gas-liquid collection container 29 which also serves as the bottom liquid storage section 11 through the bottom communication passage 23. The stored oxygen enriched liquid air passes through a conduit provided at the bottom of the gas-liquid collection container 29, is decompressed by a pressure reducing valve 33, supplied into the bottom evaporation passage 17, and is completely vaporized. Then, the vaporized oxygen enriched air is then led out as waste gas for a cold source with a low nitrogen concentration through the fluid collection section 13 and the conduit 73 of which the first end is connected to the fluid outlet 13a and the second end is connected to the expansion turbine 47. The led-out waste gas is heated in the main heat exchanger 41, introduced into the expansion turbine 47 to generate cold required for the device, introduced into the main heat exchanger 41 by the conduit 75, cools the raw material air, and reaches room temperature.

Components other than liquid contained in the oxygen enriched liquid air introduced into the multistage liquid storage-type condenser-evaporator 1, that is, the gas led out from the opening of the circulation liquid storage section 9 is led out through a conduit 77, of which a first end is connected to the evaporated gas outlet 9a provided on the upper part of the gas-liquid collection container 29, as an exhaust gas for improving the nitrogen recovery rate, which has a large nitrogen composition, is pressurized by a expansion turbine blower 55, introduced into the raw material air, and becomes a part of the raw material gas of the distillation column 43.

In the present embodiment, a part of the oxygen enriched liquid air in the lower part of the distillation column 43 becomes an exhaust gas having a large nitrogen composition by the multistage liquid storage-type condenser-evaporator 1 and circulates as a raw material gas in the distillation column 43. Therefore, since the apparent raw material air is increased, the nitrogen recovery rate of the distillation column 43 is improved.

EXPLANATION OF REFERENCE NUMERAL

1 multistage liquid storage-type condenser-evaporator
3 heat exchange section
5 liquid communication section
7 heat exchanger core
9 circulation liquid storage section
9a evaporated gas outlet
11 bottom liquid storage section
13 fluid collection section
13a fluid outlet
15 condensation passage
17 evaporation passage
17a evaporation inflow passage
17b evaporation outflow passage
19 nitrogen gas header
19a nitrogen gas introduction pipe
21 communication passage
23 bottom communication passage
25 liquid inlet
27 liquid outlet
29 gas-liquid collection container
31 pipe
33 pressure reducing valve
35 nitrogen production device
37 raw material air compressor
39 pretreatment equipment
41 main heat exchanger
43 distillation tower
45 pressure reducing valve
47 expansion turbine
49 second distillation column
51 condenser-evaporator
53 pressure reducing valve
55 expansion turbine blower
56 nitrogen production device
57 to 95 conduit

The invention claimed is:
1. A multistage liquid storage condenser-evaporator comprising:
    a condensation passage configured to convey gas in a vertical direction;
    an evaporation passage divided into multiple stages in a vertical direction, the evaporation passage being configured to convey a liquid and exchange heat between the gas flowing in the condensation passage and the liquid flowing in the evaporation passage so that the gas in the condensation passage condenses and the liquid in the evaporation passage evaporates;
    a plurality of circulation liquid storage sections, each of the plurality of circulation liquid storage sections being connected to the evaporation passage at a corresponding one of the multiple stages except a bottom stage, each circulation liquid storage section being configured to supply the liquid into the evaporation passage, store the liquid flowing out from the evaporation passage, and circulate the liquid in the evaporation passage at the corresponding one of the multiple stages;

a communication passage configured to convey the liquid from an upper circulation liquid storage section of the plurality of circulation liquid storage sections to a lower circulation liquid storage section of the plurality of circulation liquid storage sections;

a bottom liquid storage section;

a bottom communication passage configured to convey the liquid from the lower circulation liquid storage section to the bottom liquid storage section, the bottom liquid storage section being configured to store the liquid supplied to the bottom stage of the evaporation passage without circulating the liquid; and a fluid collection section configured to collect fluid from the bottom stage of the evaporation passage and discharge the collected fluid to the outside of the multistage liquid storage condenser-evaporator without returning the collected fluid to the bottom liquid storage section, wherein the multistage liquid storage condenser-evaporator is configured so that any fluid discharged from the bottom stage of the evaporation passage does not return to the bottom liquid storage section, wherein the condensation passage and the evaporation passage are stacked to form a heat exchange section, wherein the heat exchange section forms a heat exchanger core, and wherein each of the plurality of circulation liquid storage sections is formed on at least one side surface of the heat exchanger core in a width direction of the heat exchanger core orthogonal to the stacking direction.

2. The multistage liquid storage condenser-evaporator according to claim 1, wherein the multistage liquid storage condenser-evaporator further comprises:

an evaporated gas outlet configured to discharge evaporated gas from the circulation liquid storage sections;

a liquid inlet configured to supply liquid from the outside of the multistage liquid storage condenser-evaporator to a top circulation liquid storage section of the plurality of circulation liquid storage sections; and a liquid outlet configured to discharge the liquid in the bottom liquid storage section.

3. The multistage liquid storage condenser-evaporator according to claim 1, wherein the bottom liquid storage section is a gas-liquid collection container configured to collect the gas from one of the plurality of circulation liquid storage sections, the gas-liquid collection container comprising:

a liquid inlet configured to introduce liquid from the outside of the multistage liquid storage condenser-evaporator into a top circulation liquid storage section of the plurality of circulation liquid storage sections;

an evaporated gas outlet configured to discharge collected evaporated gas; and a liquid outlet configured to discharge stored liquid.

4. The multistage liquid storage condenser-evaporator according to claim 2, further comprising:

a conduit configured to supply liquid discharged from the liquid outlet to the bottom stage of the evaporation passage; and a decompressor located in the conduit.

5. The multistage liquid storage condenser-evaporator according to claim 2, wherein the heat exchanger core comprises the heat exchange section and a liquid communication section, wherein the liquid communication section comprises the communication passage and the bottom communication passage, and wherein the liquid communication section is located on at least one side of the heat exchange section in the stacking direction of the condensation passage and the evaporation passage forming the heat exchange section.

6. A nitrogen production device comprising:

first and second distillation columns in which a mixed fluid of oxygen, nitrogen and argon is separated by cryogenic distillation;

an expansion turbine;

the multistage liquid storage condenser-evaporator according to claim 2;

a first conduit configured to introduce at least a part of nitrogen gas from an upper part of the first distillation column into a nitrogen gas introduction pipe of the multistage liquid storage condenser-evaporator;

a second conduit configured to introduce liquid nitrogen from the condensation passage of the multistage liquid storage condenser-evaporator into an upper part of the first distillation column as a reflux liquid;

a third conduit configured to introduce at least a part of oxygen enriched liquid air from a lower part of the first distillation column into the liquid inlet of the multistage liquid storage condenser-evaporator;

a fourth conduit configured to introduce at least a part of gas discharged from the fluid collection section into the expansion turbine as a cold source; and a fifth conduit configured to introduce a part of gas discharged from the evaporated gas outlet as a raw material for the second distillation column.

7. A nitrogen production device comprising:

the multistage liquid storage condenser-evaporator according to claim 2;

a distillation column in which a mixed fluid of oxygen, nitrogen and argon is separated by cryogenic distillation;

an expansion turbine;

a first conduit configured to introduce at least a part of nitrogen gas from an upper part of the distillation column into a nitrogen gas introduction pipe of the multistage liquid storage condenser-evaporator;

a second conduit configured to introduce liquid nitrogen from the condensation passage of the multistage liquid storage condenser-evaporator into an upper part of the distillation column as a reflux liquid;

a third conduit configured to introduce oxygen enriched liquid air from a bottom of the distillation column into the liquid inlet of the multistage liquid storage condenser-evaporator;

a fourth conduit which is configured to introduce at least a part of gas 1 discharged from the fluid collection section into the expansion turbine as a cold source; and a fifth conduit which is configured to introduce a part of gas discharged from the evaporated gas outlet into the distillation column as a part of a raw material air.

8. The multistage liquid storage condenser-evaporator according to claim 1, wherein the bottom liquid storage section is configured to store the liquid supplied to the bottom stage of the evaporation passage without circulating the liquid, in use.

9. The multistage liquid storage condenser-evaporator according to claim 1, wherein the bottom stage of the evaporation passage is configured to completely evaporate the liquid and the fluid collection section is configured to discharge the evaporated fluid to the outside of the multistage liquid storage condenser-evaporator without returning into the bottom liquid storage section.

* * * * *